Patented Oct. 26, 1926.

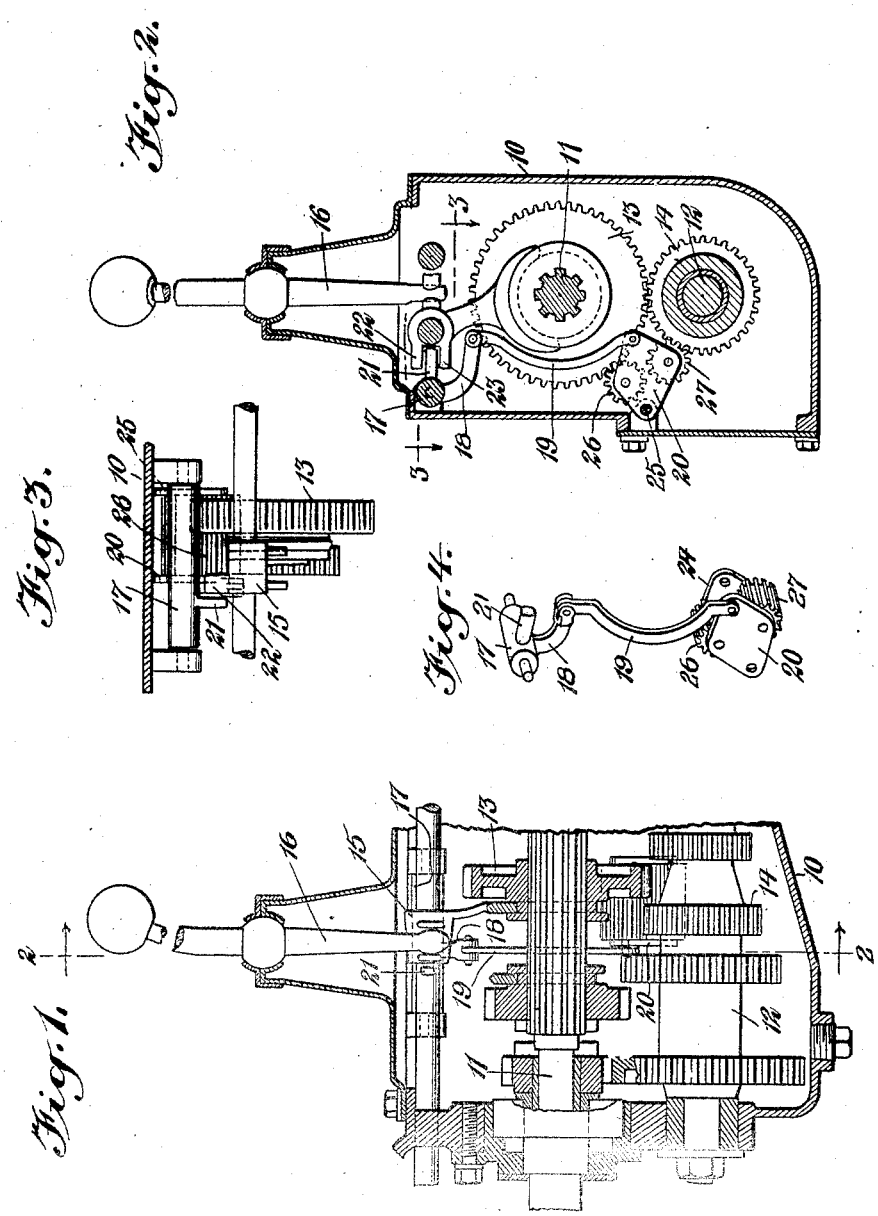

1,604,856

UNITED STATES PATENT OFFICE.

DONALD PRITCHARD SMITH, OF PRINCETON, NEW JERSEY.

CONTROL FOR GEAR-SHIFTING MECHANISM.

Application filed August 28, 1925. Serial No. 53,167.

This invention relates to the control for gear shifting mechanism.

An object of the invention is to provide a simple and efficient control so that the gears cannot be meshed by the movement of the shift lever, or other speed changing mechanism, until their linear speeds are substantially equal, whereupon they can be engaged easily and without grinding.

The invention is illustrated in the drawing of which Figure 1 is a longitudinal vertical section from a gear shifting mechanism employing my invention.

Figure 2 is a transverse section taken on the line 2—2 of Figure 1.

Figure 3 is a horizontal section taken on the line 3—3 of Figure 2;

Figure 4 is a perspective of my control device removed from the transmission casing.

In its general aspect the invention comprises means engaging in a pair of gears, which are to be meshed, in such a manner that this means is movable in accordance with the relative speeds of the gears, and by reason of this movement will dispose a stop mechanism in the path of the shifting gear, or a portion of the shifting mechanism, such as the shift fork, so that the shift member cannot be made to complete its motion and cause the gears to engage until the stop mechanism is moved out of the way. This movement of the stop mechanism is designed to occur when the linear speeds of the gears to be engaged are substantially equal.

Under these conditions the stop mechanism is disposed in a neutral or normal position out of the path of the shift member; but whenever there is any substantial difference in the linear speeds of the gears a complete movement of the shift member is impossible. Hence it will be seen that with this device grinding and clashing, during the shifting of gears, is rendered impossible.

In order to display a form of the invention, I show it in connection with a transmission casing 10, containing a main shaft 11 and a counter shaft 12. On the main shaft is a slidable gear 13, and on the counter shaft a fixed gear 14. The gear 13 is adapted to be moved along the shaft 11 to mesh with the gear 14, and is engaged by the fork 15, actuated by the lever 16. Adjacent to the fork 15 is a rock shaft 17, carrying an arm 18, connected by a tie-bar 19 to a plate 20. On the rock shaft 17 is a stop pin 21, which is shown in its normal position in Figure 2. When displaced from this normal position in either direction, stop pin 21 lies in the path of the movement of one or other of the fingers, 22 or 23, which project from the fork 15. The plate 20 is associated with another plate 24 to form a frame or pinion-carrier which is pivoted at 25 to the transmission casing. Two similar pinions, 26 and 27, are mounted between the plates upon bearings which are equally distant from the pivot 25, and upon the straight lines which join pivot 25 with the centers of gears 13 and 14 when the pinion-carrier is in its normal position. The pinions 26 and 27 mesh, respectively, with gears 13 and 14, and are of sufficient length to enable pinion 26 to remain in mesh with the sliding gear 13 at whatever point in its traverse the latter may be. The frame or pinion-carrier is caused to seek its normal position by counterweights or springs which are not shown.

In the actual operation of the device, whenever the linear speeds of the gears 13 and 14 are different they will act upon their respective pinions, 26 and 27, with different degrees of force; and in accordance with the variation of these forces will cause the frame or pinion-carrier to move slightly, in one direction or the other, around the pivotal point 25. This movement, through the connecting bar 19, the arm 18 and the rock shaft 17, will move the stop pin 21 from its normal position, either upward or downward. When the stop pin is out of its normal position, it will lie in the path of one or other of the fingers 22 or 23, so that the shift member cannot complete its full movement and cause the gears 13 and 14 to clash. When the motion of the shift mechanism is thus checked, the operator will let in his clutch and increase the speed of his engine, until, when the linear speeds of gears 13 and 14 are substantially equal, the stop pin 21 automatically returns to normal position, allowing the shift to be completed without clashing or grinding.

It is obvious that this device is extremely simple, and that it can be incorporated in the transmission casing of almost any type of automobile without necessitating material changes in standard constructions.

It is also evident that the sensitiveness of the device, or in other words the nearness with which the linear speeds of the gears to be meshed must approach each other before the stop mechanism releases, will depend upon the resistance to rotation which is offered by the pinions, 26 and 27; and that, since this resistance may be increased to any desired degree either by increasing the inertia (weight) of the pinions, or by replacing the single pinions with sets of two or more, or by placing in train with each pinion a train of secondary pinions which must be turned by the primary pinion, etc., the device may be made as sensitive as may be found necessary to give the desired smoothness of shifting.

What I claim is:—

1. In combination a gear shifting element, a gear adapted to be shifted by said element, a second gear adapted to be meshed with the first gear, means for moving said gears with relation to each other, a pair of pinions meshing respectively with said gears, a movable frame supporting the said pinions and stop means associated and movable with said frame and adapted to be disposed in the path of movement of a portion of said gear shifting element except when a definite relation of movement between said gears has been achieved, whereby a complete movement of the gear shifting element is prevented until such relation of movement is achieved.

2. In combination a gear shifting lever, a gear connected with said lever, a second gear adapted to be meshed with the first gear, means for moving said gear, a pair of pinions respectively meshing with said gears, a pivoted frame supporting said pinions, a link pivotally connected to said frame, a rock shaft connected to and actuated by said link, a stop pin connected to said rock shaft, said pin adapted to lie in the path of movement of a portion of said gear shifting lever, except when the linear speeds of said gears are the same.

3. In combination a pair of pinions, meshing respectively with the corresponding driving and driven gears of a sliding pinion gear set, the pinions of the pair being so supported that each, without becoming disengaged, is capable of a certain degree of motion relative to the gear with which it meshes; a movable frame, supporting the pinions, said frame supported within the casing; a locking stop which prevents the movement of the shift member of the gear set into its engaging position, except when the stop is in normal position, and which is associated with the movable frame which supports the pinions; the whole device comprising the pinions, the movable supporting frame, the locking stop and connecting mechanism, being so proportioned and arranged that the stop will occupy its normal position, in which it permits the gears to be shifted into mesh, only when the gears to be engaged have the same tooth speed, and hence are capable of being engaged without clashing or grinding.

4. In combination, a gear shifting element, a driven shaft and a driving shaft, a gear on one of said shafts, a second gear on the other of said shafts, said gears adapted to be meshed, a pair of pinions meshing respectively with said gears, a movable frame supporting said pinions and stop means associated and movable with said frame and adapted to be disposed in the path of movement of a portion of said gear shifting element, except when a definite relation of movement between said gears has been achieved, whereby a complete movement of the gear shifting element is prevented until such relation of movement between the gears is achieved.

DONALD PRITCHARD SMITH.